HAND TELEPHONE

Filed Sept. 7, 1965 2 Sheets-Sheet 1

INVENTOR
BELA BOTTOS

BY Thomas P. Sarro

ATTORNEY

INVENTOR
BELA BOTTOS

BY

ATTORNEY

United States Patent Office 3,474,196
Patented Oct. 21, 1969

3,474,196
HAND TELEPHONE
Bela Bottos, 2306 Greenfield Lane, Knoxville, Tenn. 37917
Filed Sept. 7, 1965, Ser. No. 485,248
Int. Cl. H04m *1/02, 1/04*
U.S. Cl. 179—103 3 Claims

ABSTRACT OF THE DISCLOSURE

In a hand telephone the improvement which comprises a fixed contact element and a movable self-restoring contact element each in electrical conection with said transmitter, a self-restoring pushbutton switch assembly comprising an electrically conductive actuatable member, an incandescent light bulb as a pushbutton for actuating said actuatable member, a socket for said light bulb, and a conductive lead electrically connecting said socket to said fixed contact element, said switch being mounted in said transmitter receptacle in a manner positioning said pushbutton light bulb in an accessible location outside said transmitter receptacle, said actuatable member cooperating with said movable, self-restoring contact element and having two positions, a normal position in which it completes a transmitter circuit and an actuated position in which said transmitter is disconnected and a light circuit established illuminating said pushbutton light bulb.

This invention relates to hand telephones and more particularly to hand telephones provided with a transmitter switch, including a visual signaling means.

There often occurs during telephone conversations, particularly lengthy telephone conversations, moments when it is desired or necessary, to audibly communicate with neighboring persons without interrupting or transmitting such communications to the calling party. With the conventional telephone this act is normally accomplished by the undependable and inconvenient covering of the transmitter with the free hand.

An object of the present invention is to provide a hand telephone having a transmitter switch by which the transmitter may be disconnected while permitting continued operation of the receiver.

Another object of the invention is a hand telephone having a transmitter switch by which the transmitter may be quickly rendered inoperable or operable by simple manipulation with a single finger of one hand, leaving the other hand free for other activity.

A further object of the invention is to provide a telephone having a transmitter switch including a visual signaling means which assures the operator that the transmitter has been disconnected, and also signals to neighboring persons who may wish confidential communications with the operator that the transmitter has been disconnected.

An important object of the invention is a unitary telephone-transmitter switch combination characterized by ease of operation and assurances of no mechanical failure that make it particularly desirable to law enforcement officials, business and professional people and others frequently confronted with moments requiring confidential communication to parties other than the caller.

Other purposes and objects of the invention will appear as the description proceeds.

The telephone hand set of the invention is of the usual type, that is, having a hollow housing of insulating, e.g. plastic, material including an intermediate handle connecting a receiver receptacle and a transmitter receptacle holding respectively a receiver and a transmitter. In accordance with the invention the transmitter is in electrical connection with both a fixed contact element and a movable, self-restoring contact element each of which in turn are connected to the necessary transmitter wiring. The self-restoring pushbutton switch assembly of this invention is mounted in the transmitter receiver and comprises an actuatable member, an incandescent light bulb as a pushbutton for actuating said actuatable member, a socket for the light bulb and a conductive lead electrically connecting the socket to the fixed contact element. Mounting of the switch assembly is in a manner that positions the pushbutton light bulb in an accessible location external the transmitter receptacle. The actuatable member of the switch assembly cooperates with the movable, self-restoring contact element and has two positions. A first position is the normal or non-actuated position in which it completes a transmitter circuit and a second position is the actuated position in which the transmitter is disconnected and a light circuit is established illuminating the pushbutton light bulb. The transmission circuit extends sequentially from the fixed contact element through the transmitter and movable, self-restoring member. Depression of the pushbutton light bulb places the actuatable member in its second position whereby it withdraws the movable, self-restoring contact element from electrical contact with the transmitter and establishes the light circuit which extends from the fixed contact element through the lead, socket, light bulb, actuatable member and movable contact element. Upon release of the pushbutton light bulb, the movable contact element is returned into contact with the transmitter and the switch assembly to its normal position.

For a better understanding of the invention, reference may be had to the following drawings in which.

Figures 1, 2:
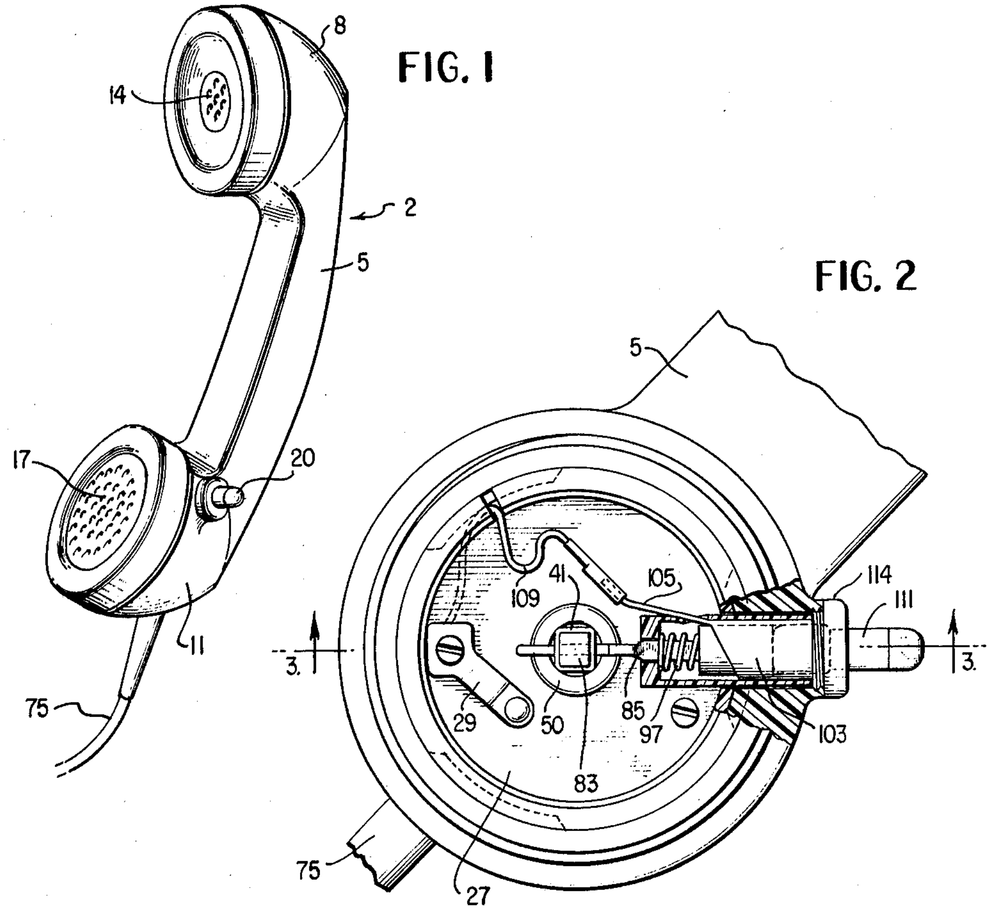
FIGURE 1 is an elevational view of the telephone handset of the present invention.
FIGURE 2 is a horizontal view, partially in cross section of the transmitter, transmitter receptacle and the transmitter pushbutton switch assembly in normal or non-actuated position.
Figure 3:
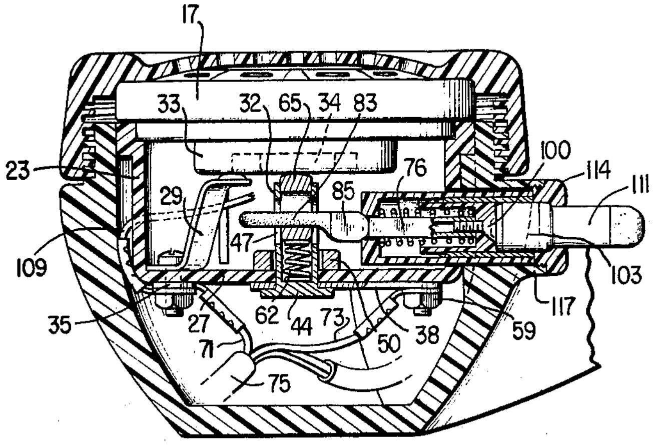
FIGURE 3 is a longitudinal view taken in part along line 3—3 of FIGURE 2.

Referring to the drawing, the hand telephone comprises a hollow housing 2, including an intermediate handle 5, connecting a receiver receptacle 8 and a transmitter receptacle 11. A receiver 14 is disposed in receiver receptacle 8 and a transmitter 17 in transmitter receptacle 11. The transmitter pushbutton switch assembly indicated generally as 20, is mounted in the transmitter receptacle 11. The transmitter receptacle 11 contains a transmitter cup 23 on which is seated the transmitter 17. The base 27 of transmitter cup 23 is provided with a fixed contact element 29 and a movable, self-restoring contact element designated generally as 32. Contact element 29 is in electrical connection with annular member 33 of transmitter 17 and movable, self-restoring contact element 32, is normally in contact with centrally-located circular member 34 of transmitter 17. The contact elements 29 and 32 are affixed respectively, to terminal 35 and terminal plate 38 provided base 27 of transmitter cup 23, and the necessary transmitter wires 71 and 73 from telephone cord 75 are connected to terminals 35 and 38, respectively.

Figures 4, 5:
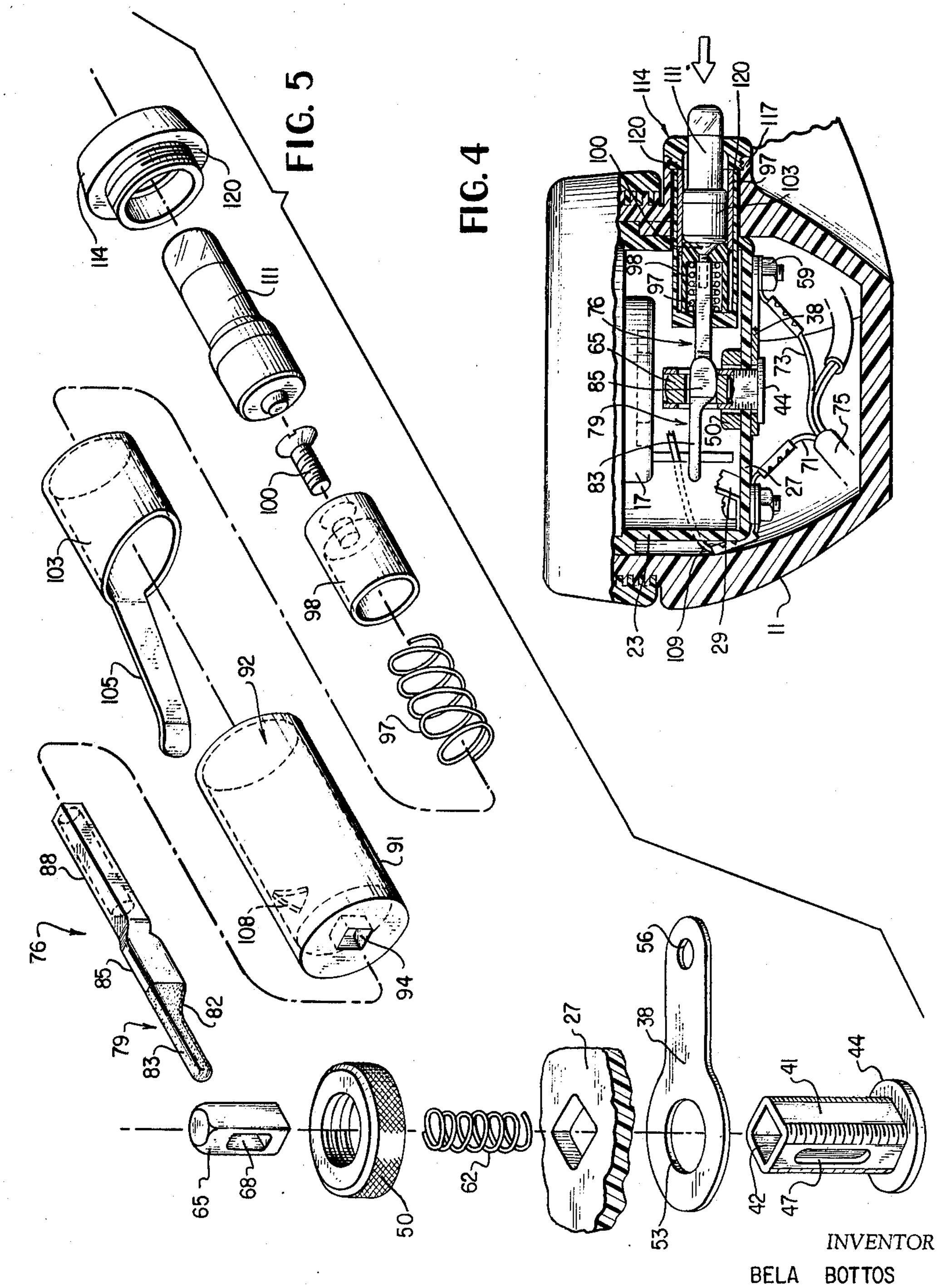
FIGURE 4 is a longitudinal view similar to FIGURE 3 but showing the pushbutton switch assembly in actuated position.
FIGURE 5 is an exploded, elevational view of the pushbutton switch assembly and the movable contact member with which it cooperates.

The movable self-restorable contact element 32 is composed of an elongated housing 41 of electrically conductive material, such as a conductive metal, and is centrally located in base 27 of cup 23. Housing 41 is closed off at its base by shouldered base 44 and contains an open end 42. Housing 41 is preferably square and externally threaded to accommodate a nut 50 by which the housing is affixed to the base 27 of the transmitter cup 23. An opening 47 is provided housing 41, intermediate open end 42 and shouldered base 44. Between the transmitter cup base 27 and shoulder base 44 of the housing 41 is positioned terminal plate 38 which contains an opening 53 (see FIGURE 5), of a size permitting passage therethrough of housing 41, yet small enough to permit contact with shoulder base 44. The terminal plate 38 also contains a smaller opening 56 by which the terminal plate 38 is further secured to base cup 27 by nut and bolt means 59. Disposed in said housing 41 is a movable member 65 of conductive material, provided with a slot 68 therethrough and biased by a compressible spring 62. Disposition of the spring 62 and movable member 65 is in a manner whereby movable member 65 in normal or non-actuated position contacts transmitter 17 and slot 68 of said movable member coincides with opening 47 of housing 41.

The pushbutton switch assembly 2 comprises an actuatable member, preferably an elongated shaft, designated generally as 76 having an end portion 79 provided a cam surface 82. The end portion 79 is insertable through the opening defined by the coinciding slot 47 of housing 41 and opening 68 of movable member 65 and cooperates with movable member 65 to withdraw said movable member from contact with transmitter 17. The end portion 79 contains a narrow portion or tip 83 of insulating material such as plastic and a wider portion 85 of conductive material. In normal or non-actuated position the insulated tip 83 rests in the opening defined by coinciding slot 47 of housing 41 and opening 68 of movable member 65. When the shaft 76 is in actuated position the wider conductive portion 85 of the cam element is disposed in the opening defined by slot 47 and opening 68 and in contact with the now disconnected movable contact element 32.

The remaining portion 88 of shaft 76 is likewise of conductive material and is movably mounted and centrally disposed in a housing 91 of insulating material containing an opening 92 at one end and a smaller opening 94 of a size that precludes retraction of conductive portion 85 of end portion 79 into housing 91. A retractable spring 97 is positioned around portion 88 of shaft 76 and a hollow cylindrical cup member 98, preferably of insulating material is provided to house spring 97. The cup member 98 is affixed at the end of shaft 76 by an electrically conductive attaching means 100 such as a flat-headed screw, which in turn is attached to and in communication with the end of shaft 76. The cup member 98 is of a length that permits extension of wide conductive portion 85 of the shaft 76 into contact with movable element 65.

A hollow, cylindrical socket 103 of electrically conductive material having a diameter slightly less than housing 91 and including a projection 105 is snuggly fitted as a liner within housing 91, said projection 105 exiting via opening 108 in insulated housing 91. Projection 105 is electrically connected through a lead wire 109 to terminal 35. Socket member 103 receives a small incandescent light bulb 111 which serves as a pushbutton. The light bulb is advantageously protected by a covering of transparent or translucent protective material such as a suitable plastic that permits transmission of discernible light. A threaded collar 114 is fitted around socket 103 and pushbutton bulb 111 and is threaded onto receiving element 117 of transmitter receptacle 11. A shoulder 120 is provided collar 114 which serves as an end stop for housing 91 and cup member 98.

In operation, when the pushbutton light bulb is not depressed or actuated, the transmitter is in condition for talking purposes, a circuit being established which extends sequentially from contact element 27, transmitter 17 and movable contact element 32. When the pushbutton is manually depressed, actuatable shaft 76, together with cup member 98 is projected inwardly, compressing spring 97 and initiating coaction of the cam surface 82 with movable member 65 to withdraw it from contact with member 34 of transmitter 17 and to bring the conductive surface 85 of the shaft 76 into contact with said movable member 65. In this manner the circuit conditioning the transmitter for talking purposes is open and a second circuit established, illuminating pushbutton light bulb 111. The second or light circuit extends sequentially from lead wire 108, through projection 105, socket 103, pushbutton bulb 111, shaft 79 and housing 41. The receiver 14 is in no way effected by the transmitter switch of the invention and remains in operation even when the transmitter is disconnected. On release of depressed pushbutton bulb 111, compressed spring 97 restores shaft 76 and pushbutton bulb 111 to its original position and closes the aforementioned circuit conditioning the transmitter for talking purposes.

While the features of this invention have been disclosed with reference to the specific embodiments described therein, it is to be understood that various modifications may be made in the details of construction without departing from the scope of this invention as defined in the appended claims.

It is claimed:

1. In a hand telephone including a receiver receptacle and a transmitter receptacle, a receiver and a transmitter disposed respectively in said receiver receptacle and transmitter receptacle and an intermediate hollow handle interconnecting said receiver receptacle and transmitter receptacle, the improvement which comprises a fixed contact element and a self-restoring movable contact element each in electrical connection with said transmitter, said movable contact element comprising an elongated housing, a spring-biased movable contact member in said housing, said movable contact member having an opening therethrough, a self-restoring bushbutton switch assembly comprising an elongated shaft having a cam surfaced end inserted in and cooperating with the opening in said movable contact member, the inserted tip of said elongated shaft member being of insulating material and the remainder of said shaft being of electrically conductive material, an incandescent light bulb as a pushbutton for actuating said elongated shaft, a socket for said light bulb and a conductive lead electrically connecting said socket to said fixed contact element, said switch being mounted in said transmitter receptacle in a manner positioning said pushbutton light bulb in an accessible location outside said transmitter receptacle, said elongated shaft having two positions, a normal position in which it completes a transmitter circuit and an actuated position in which said movable self-restoring contact member is withdrawn from contact with said transmitter and said transmitter is disconnected and a light circuit established illuminating said pushbutton light bulb.

2. In a hand telephone including a receiver receptacle and a transmitter receptacle, a receiver and transmitter disposed respectively in said receiver receptacle and transmitter receptacle and an intermediate hollow handle interconnecting said receiver receptacle and transmitter receptacle, the improvement which comprises a fixed contact element and a movable self-restoring contact element each in electrical connection with said transmitter, a self-restoring pushbutton switch assembly comprising an electrically conductive actuable member, an incandescent light bulb as a pushbutton for actuating said actuable member, a socket for said light bulb, and a conductive lead electrically connecting said socket to said fixed contact element, said switch being mounted in said transmitter receptacle in a manner positioning said pushbutton light bulb in an accessible location outside said transmitter receptacle, said actuatable member being a spring biased elongated shaft having a cam surface cooperating with said movable, self-restoring contact element and having two positions, a normal position in which it completes a transmitter circuit and an actuated position in which said movable, self-restoring contact element is withdrawn from contact with said transmitter and said transmitter is disconnected and a light circuit established illuminating said pushbutton light bulb.

3. The hand telephone of claim 2, wherein the movable, self-restoring contact element comprises an elongated housing, a spring biased movable contact member in said housing, said movable contact member cooperating with said actuatable member.

References Cited

UNITED STATES PATENTS

| | | | |
|---|---|---|---|
| 2,838,615 | 6/1958 | Leifer | 179—158 |
| 2,931,021 | 3/1960 | Brown | 179—158 |
| 1,881,834 | 10/1932 | Mitchell. | |
| 2,375,791 | 5/1945 | Johnson | 179—81 |
| 2,403,498 | 7/1946 | Brittingham | 179—158 |

OTHER REFERENCES

Licon Catalogue on the 01 Series, received Sept. 26, 1962.

KATHLEEN H. CLAFFY, Primary Examiner

A. A. McGILL, Assistant Examiner

U.S. Cl. X.R.

179—158